United States Patent
Alameh et al.

(10) Patent No.: US 10,122,847 B2
(45) Date of Patent: Nov. 6, 2018

(54) ELECTRONIC DEVICE AND METHOD FOR DETECTING PRESENCE AND MOTION

(71) Applicant: Motorola Mobility LLC, Chicago, IL (US)

(72) Inventors: Rachid M Alameh, Crystal Lake, IL (US); Patrick J Cauwels, South Beloit, IL (US); Paul R Steuer, Hawthorn Woods, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 332 days.

(21) Appl. No.: 14/450,538

(22) Filed: Aug. 4, 2014

(65) Prior Publication Data
US 2016/0021241 A1    Jan. 21, 2016

Related U.S. Application Data

(60) Provisional application No. 62/026,702, filed on Jul. 20, 2014.

(51) Int. Cl.
| | |
|---|---|
| *G01J 5/22* | (2006.01) |
| *H04M 3/02* | (2006.01) |
| *H04M 1/725* | (2006.01) |
| *G02B 5/09* | (2006.01) |
| *G02B 5/10* | (2006.01) |
| *H04M 1/02* | (2006.01) |

(52) U.S. Cl.
CPC ......... *H04M 3/02* (2013.01); *H04M 1/72569* (2013.01); *G02B 5/09* (2013.01); *G02B 5/10* (2013.01); *H04M 1/026* (2013.01)

(58) Field of Classification Search
CPC . G02B 5/09; G01J 1/4204; G01J 5/026; G01J 5/0022; G01J 5/22
See application file for complete search history.

(56) References Cited

U.S. PATENT DOCUMENTS

| | | | | |
|---|---|---|---|---|
| 3,886,360 | A * | 5/1975 | Reiss | G08B 13/193 250/338.1 |
| 3,923,382 | A * | 12/1975 | Harding | G08B 13/193 250/353 |
| 3,972,598 | A * | 8/1976 | Kunz | G08B 13/193 250/338.1 |

(Continued)

OTHER PUBLICATIONS

Rachid M. Alameh, et al, "Electronic Device and Method for Detecting Presence and Motion", U.S. Appl. No. 14/103,902, filed Dec. 12, 2013.

(Continued)

*Primary Examiner* — Marcus Taningco
*Assistant Examiner* — Djura Malevic
(74) *Attorney, Agent, or Firm* — Shumaker & Sieffert, P.A.

(57) ABSTRACT

Apparatus and methods for detecting presence and motion by an electronic device are disclosed. In an example device, the device includes a housing defining an opening, an infrared ("IR") sensor located within the housing and generating an indication signal when the IR sensor detects an IR signal. The example device may further include a mirror disposed within the housing and having an unobstructed path and line of sight to outside of the electronic device via the opening and oriented to direct the first IR signal towards the IR sensor.

16 Claims, 11 Drawing Sheets

(56) References Cited

U.S. PATENT DOCUMENTS

| | | | | |
|---|---|---|---|---|
| 4,081,680 | A * | 3/1978 | Keller | G02B 5/10 250/338.1 |
| 4,518,218 | A * | 5/1985 | Diepeveen | G02B 5/09 359/217.1 |
| 4,707,604 | A * | 11/1987 | Guscott | G08B 13/193 250/342 |
| 4,709,152 | A * | 11/1987 | Muller | G08B 13/193 250/342 |
| 4,849,737 | A * | 7/1989 | Kirihata | G01J 5/0022 250/342 |
| 4,880,980 | A * | 11/1989 | Muller | G08B 13/193 250/342 |
| 4,990,783 | A * | 2/1991 | Muller | G08B 13/193 250/342 |
| 5,249,128 | A * | 9/1993 | Markandey | B60K 31/0008 180/170 |
| 5,473,368 | A * | 12/1995 | Hart | G08B 13/1963 348/155 |
| 5,703,368 | A * | 12/1997 | Tomooka | G08B 13/19 250/349 |
| 5,726,443 | A * | 3/1998 | Immega | G01S 17/026 250/208.1 |
| 6,304,180 | B1 * | 10/2001 | Platner | H05B 37/0227 307/117 |
| 6,346,705 | B1 * | 2/2002 | Lee | G01J 5/0022 250/353 |
| 6,559,448 | B1 * | 5/2003 | Muller | G08B 13/193 250/340 |
| 6,677,589 | B2 * | 1/2004 | Hironaka | G08B 13/191 250/336.1 |
| 6,791,087 | B1 * | 9/2004 | Okumura | G01D 3/0365 250/342 |
| 7,187,505 | B2 * | 3/2007 | Claytor | G02B 3/08 359/356 |
| 7,244,939 | B2 * | 7/2007 | Stuttard | G01N 21/3504 250/343 |
| 7,330,115 | B1 * | 2/2008 | Zuba | F21V 23/0435 340/541 |
| 7,480,208 | B2 * | 1/2009 | Bender | G08B 13/1618 340/554 |
| 7,599,044 | B2 * | 10/2009 | Hotelling | G01S 17/026 356/141.1 |
| 8,344,325 | B2 * | 1/2013 | Merrell | G06F 3/017 250/349 |
| 8,384,556 | B2 * | 2/2013 | Ko | G08B 13/19 340/332 |
| 8,643,628 | B1 * | 2/2014 | Eriksson | G06F 1/169 345/173 |
| 8,704,152 | B2 * | 4/2014 | Svajda | G01S 3/7803 250/221 |
| 8,772,702 | B2 * | 7/2014 | Bachels | G08B 13/191 250/221 |
| 8,907,781 | B2 * | 12/2014 | Tomooka | G08B 13/193 340/539.1 |
| 8,928,487 | B2 * | 1/2015 | Dyer | F21V 23/0471 340/693.11 |
| 9,165,443 | B2 * | 10/2015 | Bachels | G08B 13/193 |
| 9,331,219 | B2 * | 5/2016 | Zivkovic | H01L 31/0232 |
| 9,368,529 | B2 * | 6/2016 | Eisele | G01S 7/4816 |
| 2005/0226532 | A1 * | 10/2005 | Thompson | G06T 7/60 382/286 |
| 2007/0018106 | A1 * | 1/2007 | Zhevelev | G01J 5/08 250/353 |
| 2007/0103671 | A1 * | 5/2007 | Ash | F41G 3/02 356/139.01 |
| 2007/0273658 | A1 * | 11/2007 | Yli-Nokari | G06F 3/03547 345/173 |
| 2007/0279215 | A1 * | 12/2007 | Tomooka | G08B 13/19 340/522 |
| 2008/0142716 | A1 * | 6/2008 | Wong | G06F 1/3203 250/338.1 |
| 2008/0219672 | A1 * | 9/2008 | Tam | H03K 17/9631 398/130 |
| 2010/0127969 | A1 * | 5/2010 | Changchien | G06F 3/0304 345/156 |
| 2010/0294938 | A1 * | 11/2010 | Alameh | G06F 3/0308 250/342 |
| 2010/0299642 | A1 * | 11/2010 | Merrell | G06F 3/0325 715/863 |
| 2011/0010572 | A1 * | 1/2011 | Chen | G06F 1/3203 713/323 |
| 2011/0179368 | A1 * | 7/2011 | King | G06F 3/04815 715/769 |
| 2011/0248152 | A1 * | 10/2011 | Svajda | G01S 3/7803 250/221 |
| 2012/0153868 | A1 * | 6/2012 | Gu | H05B 37/0227 315/307 |
| 2013/0112878 | A1 * | 5/2013 | Zhao | G08B 13/191 250/340 |
| 2013/0214166 | A1 * | 8/2013 | Barlow | G01S 5/16 250/342 |

OTHER PUBLICATIONS

Rachid M. Alameh, et al., "Electronic Device and Method for Detecting Presence", U.S. Appl. No. 14/103,909, filed Dec. 12, 2013.
Rachid M. Alameh, et al, "Electronic Device and Method for Detecting Presence", U.S. Appl. No. 14/103,922, filed Dec. 12, 2013.
Rachid M. Alameh, et al., "Display Viewing Detection", U.S. Appl. No. 14/444,273, filed Jul. 28, 2014.
Roger W. Ady, et al., "User Interface Adaptation Based on Detected User Location", U.S. Appl. No. 14/447,649, filed Jul. 31, 2014.

* cited by examiner

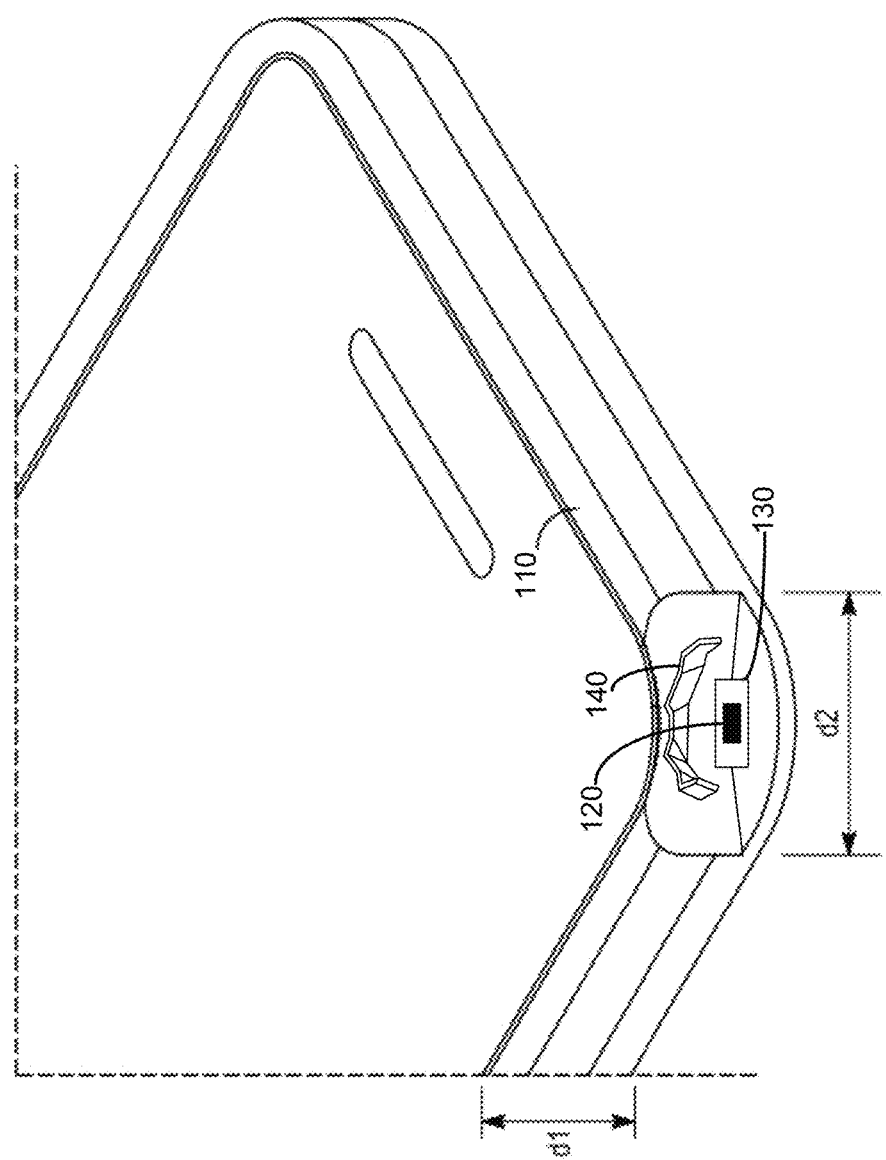

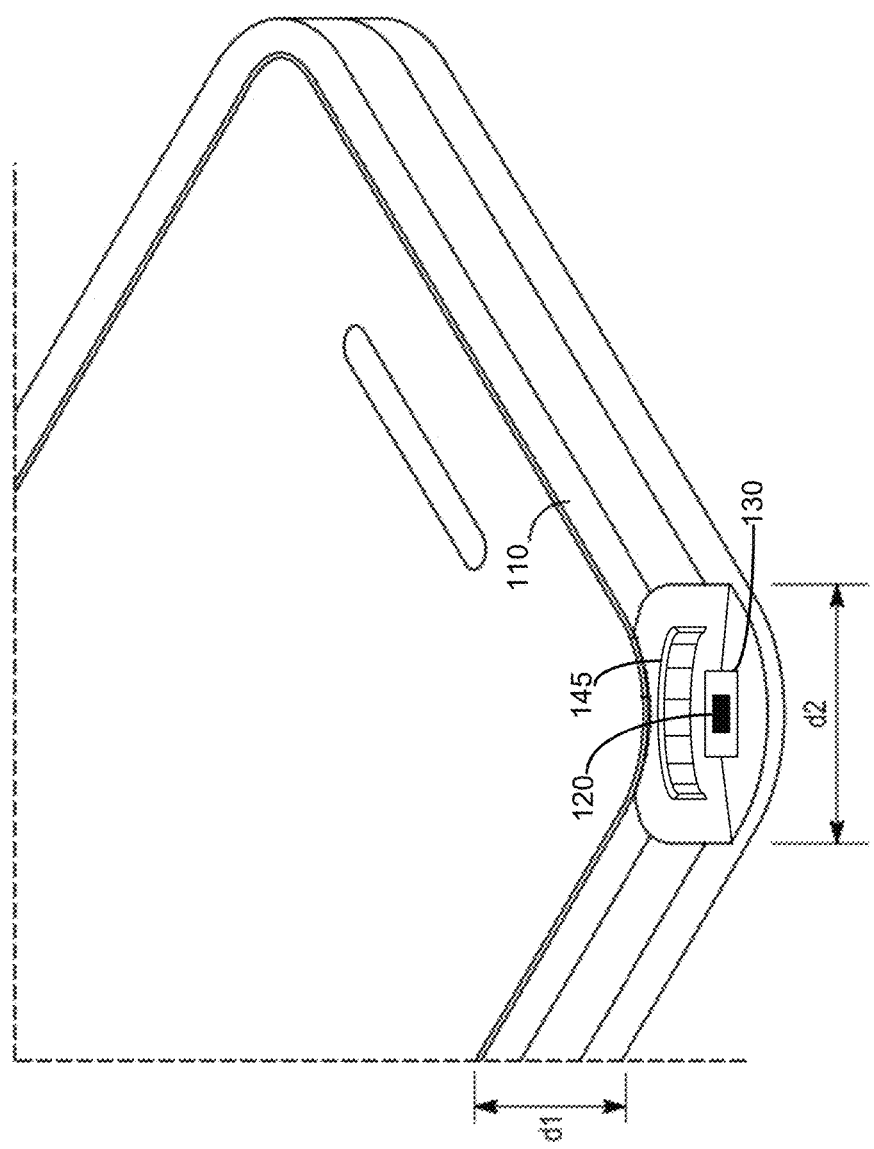

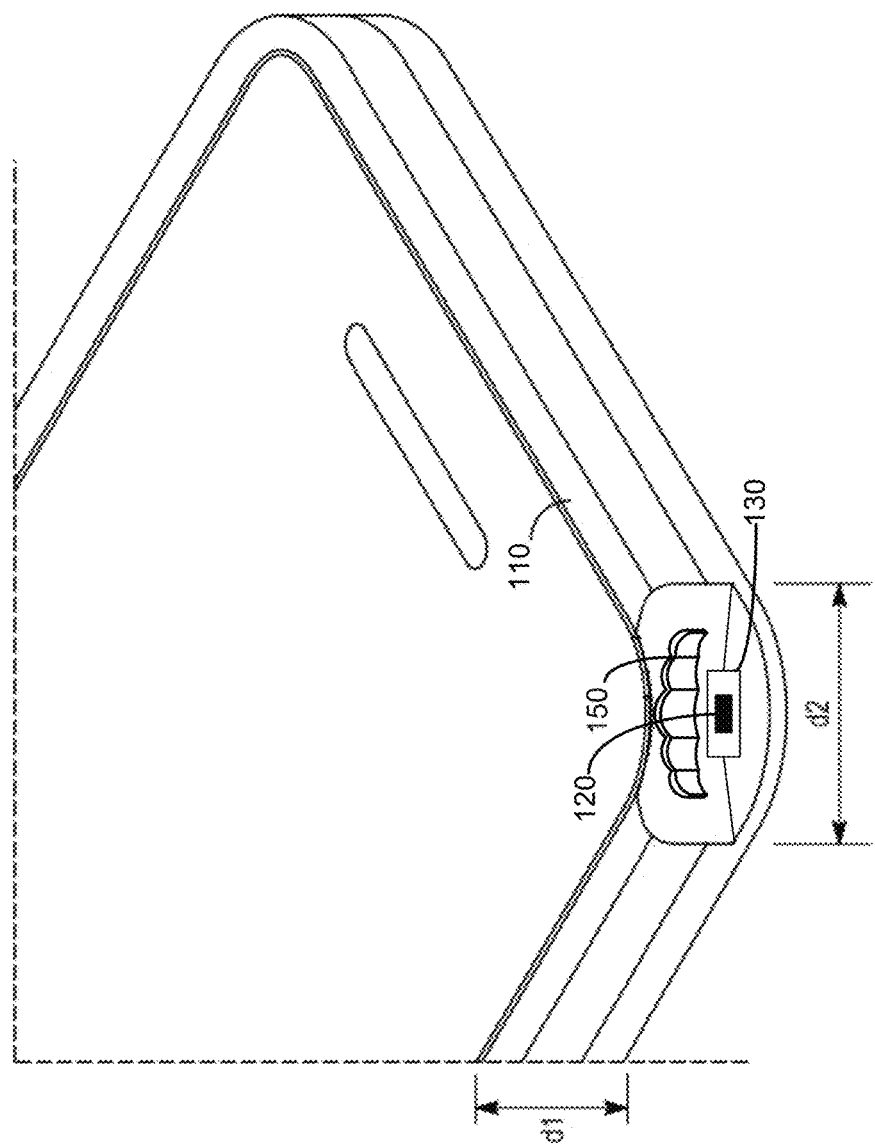

ELECTRONIC DEVICE AND METHOD FOR DETECTING PRESENCE AND MOTION

CROSS-REFERENCE TO RELATED APPLICATIONS

The present application claim priority to U.S. Provisional Patent Application No. 62/026,702, filed Jul. 20, 2014, the contents of which are incorporated herein by reference.

TECHNICAL FIELD

The present disclosure relates to methods for detecting presence and motion and, more particularly, to methods and systems applicable to mobile electronic devices for detecting presence and motion.

BACKGROUND

Mobile devices such as cellular telephones, smart phones, and other handheld or portable electronic devices such as personal digital assistants ("PDAs"), headsets, and MP3 players have become popular and ubiquitous. Such devices are used for business and entertainment, and can also assist users with everyday tasks. As more and more features are incorporated into mobile devices, there is an increasing desire to equip these mobile devices with input/output mechanisms that accommodate numerous user commands and/or react to numerous user behaviors.

It is of particular interest that mobile devices be capable of detecting the presence and position of physical objects located outside of a mobile device. Within this field of interest, it is of particular interest that such devices be able to detect the presence and determine the location of nearby personnel or their heads, hands, etc. Such personnel may be users of the device or may simply be individuals located nearby the device. One result of such detection and determination capability is to allow the mobile device to adjust its behavior as appropriate given the presence (or absence) and location of the human beings and/or other physical objects.

While remote sensing devices such as infrared (or, more accurately, near-infrared) transceivers have been employed in the past in some mobile devices to allow for the detection of the presence and/or location of human beings and/or physical objects, such sensing devices have been limited in various respects. In particular, some such near-infrared transceivers in some such mobile devices are only able to detect actual movement of the person or object, but are not able to detect the continuous presence of the person or object. Moreover, some such transceivers in some such mobile devices are undesirably complicated, requiring large numbers of components in order to operate, or requiring optical elements that attenuate the received infrared signals. The additional elements and complication of such systems render such devices unduly expensive and inefficient.

DRAWINGS

While the appended claims set forth the features of the present techniques with particularity, these techniques may be best understood from the following detailed description taken in conjunction with the accompanying drawings of which:

FIG. 3A is a perspective view of an infrared sensor disposed in an electronic device such as that of FIG. 1A or FIG. 1B, in accordance with an embodiment;

FIG. 3B is a perspective view of a mirror and an infrared sensor disposed in an electronic device such as that of FIG. 1A or FIG. 1B, according to another embodiment;

FIG. 3C is a perspective view of a mirror and an infrared sensor disposed in an electronic device such as that of FIG. 1A or FIG. 1B, according to yet another embodiment;

DESCRIPTION

Figure 1A:
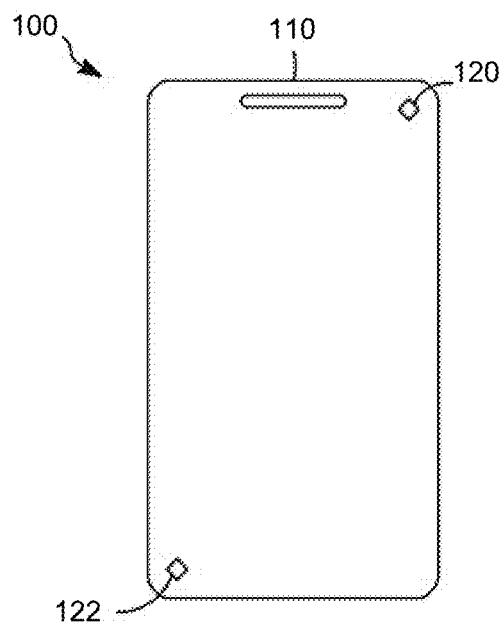
FIG. 1A is a top view of an electronic device, which is depicted as a mobile device in the drawing, within which an embodiment of the disclosed principles may be implemented.

In overview, the present disclosure relates to an electronic device for detecting presence and motion near a mobile electronic device using infrared sensors. In an embodiment, the electronic device includes a housing, an infrared ("IR") sensor, a mirror, and a processor. The housing has an interior and an exterior and an opening from the interior to the exterior. The first IR sensor is disposed within the housing interior and generates a first indication signal when the IR sensor detects a first IR signal. The mirror is also disposed within the housing interior and has an unobstructed optical path to the outside of the electronic device via the opening. The mirror is oriented to direct the first IR signal towards the IR sensor which in an embodiment includes a downward tilt of the mirror. The processor receives the first indication signal from the IR sensor when the first IR signal is sensed by the IR sensor and may modify a behavior of the electronic device in response to the first indication signal.

The mirror may be a segmented mirror having a plurality of segments which receive incoming IR signals from the opening at mutually distinct angles. Alternatively, the mirror may be a continuously curved mirror having a reflective surface segmented into a plurality of mirror segments via blackouts, cut outs, or otherwise nonreflective sections at the wavelength of interest (such as 4 to ~10 micrometer). The plurality of mirror segments are oriented to receive incoming IR radiation from the opening at mutually distinct angles. Alternatively, the mirror may include a series of two-dimensionally-dished reflecting surfaces. The dished reflective surfaces may be configured to cover mutually distinct angles for receiving incoming IR radiation from the opening. Herein, an occurrence of IR radiation is sometimes referred to as an IR signal.

The processor of the electronic device may generate a second indication signal when it detects a second IR signal, and the processor may then determine motion based on the first and second indication signals. The processor is configured in an embodiment to carry out a function in response to an indication signal. In an embodiment, the functions include, but are not limited to including, at least one of answering a call, dismissing a call, silencing a ringer, sending a call to voicemail, turning on a screen, waking up the electronic device, viewing the time, scrolling a screen, scrolling through photos, panning a map, alerting of messages, magnifying a view, switching audio mode, setting audio level, steering audio toward the person's location, steering camera toward the person's location, and altering device functionality based on distance between the person and the device.

In another embodiment, an electronic device includes a housing, a first IR sensor, a second IR sensor, a first mirror, and a second mirror. The housing includes a first corner having a first opening formed thereon and a second corner having a second opening formed thereon. The first mirror is disposed proximate to the first corner and has an unobstructed path and line of sight to the outside of the electronic device via the first opening. The second mirror is disposed proximate to the second corner and has an unobstructed path and line of sight to the outside of the electronic device via the second opening. The first and second mirrors direct external IR signals towards the first and second IR sensors, respectively.

Turning to the figures, FIG. 1A is a top view of an electronic device 100, which is depicted as a mobile device in the drawing, according to an embodiment. The electronic device 100 includes a housing 110, a first IR sensor 120, and a second IR sensor 122. As shown, the first IR sensor 120 is disposed within the housing 110 and proximate to a first corner of the housing 110, and the second IR sensor 122 is disposed within the housing 110 and proximate to a second corner of the housing 110.

In the illustrated embodiment, the first corner and the second corner are disposed diagonally opposite from one another. However, other arrangements are viable as well and the first IR sensor 120 and second IR sensor 122 need not be located proximate to the corners of the electronic device 100 in every embodiment. At least one of the first IR sensor 120 and the second IR sensor 122 receive an IR signal via an internally disposed mirror (not shown in FIGS. 1A and 1B) which reflects a sensed IR signal from outside the device 100 via at least one opening in the housing 110.

Figure 1B:
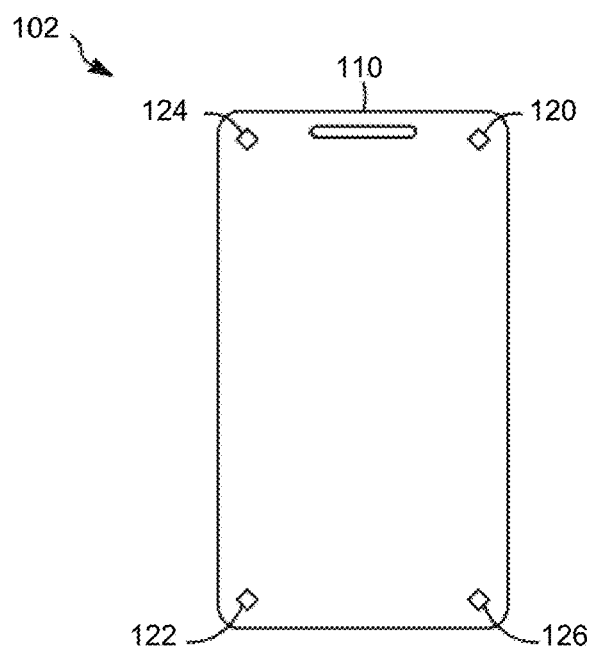
FIG. 1B is a top view of an electronic device, which is depicted as a mobile device in the drawing, within which an alternative embodiment of the disclosed principles may be implemented.

FIG. 1B is a top view of a mobile electronic device 102 according to an alternative embodiment of the disclosed principles. The electronic device 102 has the same general structure as the electronic device 100 of FIG. 1A. As shown in FIG. 1B, the electronic device 102 includes a housing 110 having four corners. However, rather than including two IR sensors, four IR sensors are disposed within the housing 110. The first IR sensor 120 is disposed proximate to the first corner, the second IR sensor 122 is disposed proximate to the second corner, the third IR sensor 124 is disposed proximate to the third corner, and the fourth IR sensor 126 is disposed proximate to the fourth corner.

The first corner and the second corner are disposed diagonally opposite from one another, and likewise the third and fourth corner are disposed diagonally opposite from one another. It will be appreciated by those of skill in the art that other arrangements are viable as well. At least one of the first IR sensor 120, the second IR sensor 122, the third IR sensor 124, and the fourth IR sensor 126 receives an IR signal via an internally disposed mirror (not shown) which reflects the IR signal from outside the device 100 via at least one opening in the housing 110.

Figure 2:
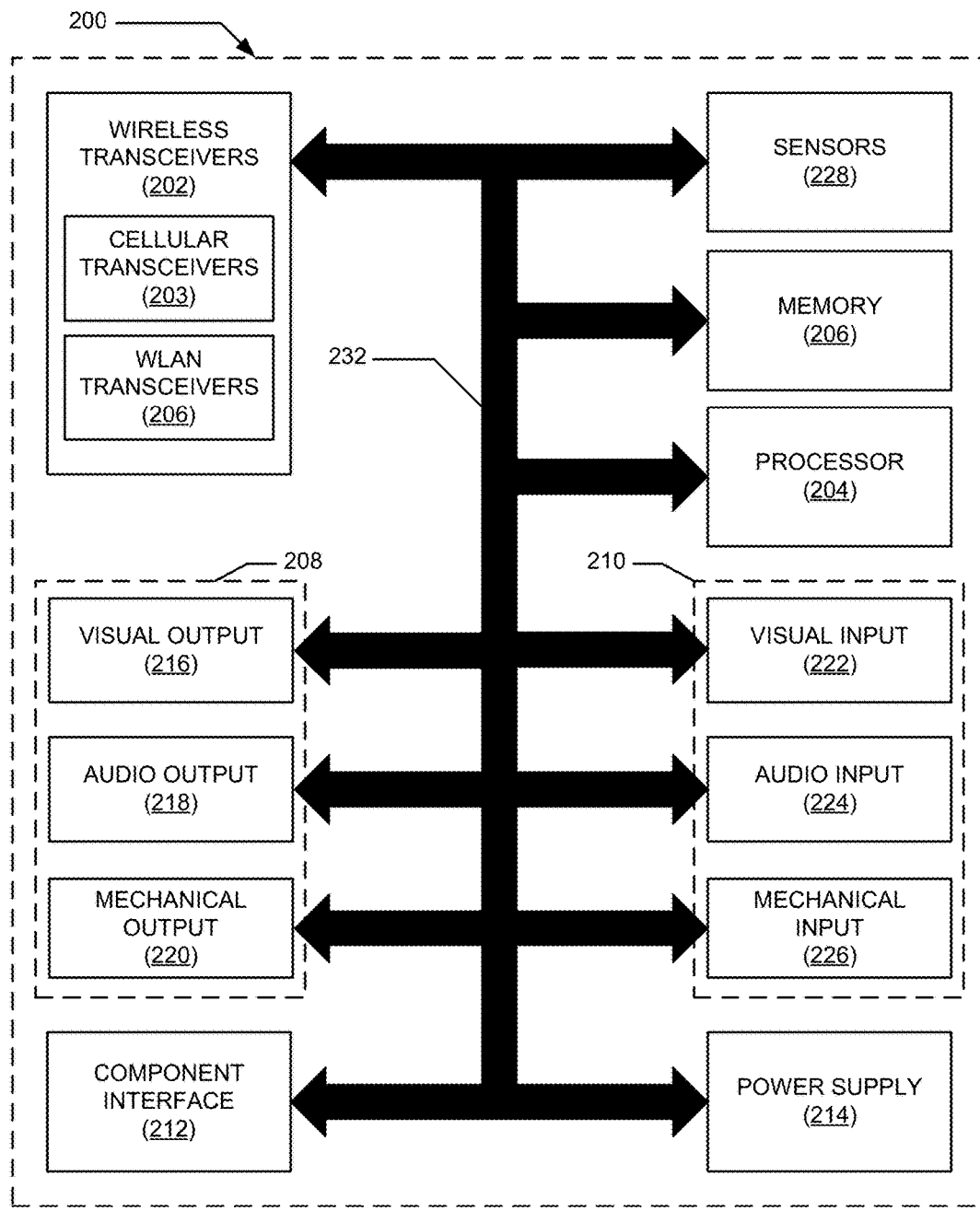
FIG. 2 is a simplified schematic showing example components of the electronic devices of FIGS. 1A and 1B.

While the light collection capabilities of the disclosed arrangement will be discussed further below, some discussion of the electronic processes may be useful at this point. In this connection, FIG. 2 shows example components of the electronic devices (100, 102) of FIGS. 1A and 1B, in accordance with an embodiment of the disclosure. In the illustrated example of FIG. 2, the internal components 200 include one or more wireless transceivers 202, a processor 204 (e.g., a microprocessor, microcomputer, application-specific integrated circuit, etc.), a memory portion 206, one or more output devices 208, and one or more input devices 210.

The internal components 200 may further include a component interface 212 to provide a direct connection to auxiliary components or accessories for additional or enhanced functionality. The internal components 200 may also include a power supply 214, such as a battery, for providing power to the other internal components while enabling the mobile device to be portable. Further, the internal components 200 additionally include one or more sensors 228. The internal components 200 can be communicatively coupled to one another as needed by way of one or more internal communication links 232 (e.g., an internal bus).

Further, in the embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, via infrastructure cell towers (not shown). Alternatively, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

In contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 may additionally or alternatively conduct other types of communications commonly understood as being encompassed within Wi-Fi communications such as some types of peer-to-peer communications, e.g., Wi-Fi peer-to-peer. Further, in other embodiments, the Wi-Fi transceiver 205 may be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the illustrated embodiment the device 100 or 102 have specific numbers of wireless transceivers (e.g., transceivers 203 and 205), the present disclosure is intended to encompass embodiments in which any arbitrary number of wireless transceivers employing any arbitrary number of communication technologies are present. By virtue of the use of the wireless transceivers 202, the device 100 or 102 is capable of communicating with any of a variety of other devices or systems (not shown) including, for example, other mobile devices, web servers, cell towers, access points, other remote devices, etc. Depending upon the embodiment or circumstance, wireless communication between the device 100 or 102 and any arbitrary number of other devices or systems can be achieved.

Operation of the wireless transceivers 202 in conjunction with others of the internal components 200 of the device 100 or 102 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as a microphone (or further for example a microphone of a Bluetooth headset), and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the internal components 200 also include one or more of various types of sensors 228 as well as a sensor hub to manage one or more functions of the sensors. The sensors 228 include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the device 100 or 102.

Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the embodiment under discussion the input devices 210 are shown to be distinct from the output devices 208, it should be recognized that in some embodiments one or more devices serve both as input devices and output devices. In particular, in the present embodiment in which the device 100 or 102 includes a touch screen display, the touch screen display can be considered to constitute both a visual output device and a mechanical input device (by contrast, keys or buttons are merely mechanical input devices).

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the device 100 or 102 can be supplemented or replaced by other memory portion(s) located elsewhere apart from the mobile device and, in such embodiments, the mobile device can be in communication with or access such other memory device(s) by way of any of various communications techniques, for example, wireless communications afforded by the wireless transceivers 202, or connections via the component interface 212.

The data that is stored by the memory portion 206 can include, but need not be limited to, operating systems, programs (applications), modules, and informational data. Each operating system includes executable code that controls basic functions of the device 100 or 102, such as interaction among the various components included among the internal components 200, communication with external devices via the wireless transceivers 202 and/or the component interface 212, and storage and retrieval of programs and data, to and from the memory portion 206. As for programs, each program includes executable code that utilizes an operating system to provide more specific functionality, such as file system service and handling of protected and unprotected data stored in the memory portion 206. Such programs can include, among other things, programming for enabling the device 100 or 102 to perform a process such as the process for presence and/or motion detection as discussed in greater detail below. Finally, with respect to informational data, this is non-executable code or information that can be referenced and/or manipulated by an operating system or program for performing functions of the device 100 or 102.

FIG. 3A is a perspective view of the first IR sensor 120 disposed in the electronic devices 100 and 102 of FIG. 1A and FIG. 1B. Although the first IR sensor 120 is shown, the same sensor assembly may be adapted for the second IR sensor 122 of the device 100 of FIG. 1A. Similarly, the same sensor assembly may be adapted for each of the second IR sensor 122, the third IR sensor 124, and the fourth IR sensor 126 of the device 102 of FIG. 1B. In other words, the first IR sensor 120 and its assembly are representative of the other IR sensors and their assemblies.

The first corner of the housing 110 is shown in FIG. 3A. The first IR sensor 120 is disposed within the housing 110 and proximate to the first corner. The first IR sensor 120 is connected to a flexible circuit 130 (e.g., flexible printed circuit board), which enables communication between the first IR sensor 120 and a processor in the electronic device 100 (e.g., the processor 204 of FIG. 2). The first IR sensor 120 is an IR receiver, and the sensor assembly as shown in FIG. 3A does not include an IR transmitter. In the present disclosure, the IR transmitter is a person near the device, who may emit body heat or IR signal having a wavelength of about 10 microns. To detect the heat emitted by the person, the first IR sensor 120 may be a passive heat sensor (e.g., a thermopile sensor), or a heat motion sensor (e.g., a pyroelectric sensor), or other passive heat sensor known in the art.

In an embodiment, the first IR sensor 120 is a thermopile sensor configured to detect emitted heat or IR signals having a wavelength that ranges between about 5 microns and about 100 microns. This wavelength range serves to delineate between heat emitted by a person and heat emitted by inanimate objects, e.g., other electronic devices.

Although such dimensions are not critical, the thickness $d_1$ of the housing 110 may be about 8 millimeters to about 10 millimeters, and the length $d_2$ of the corner may be about 13 millimeters to about 18 millimeters. In other embodiments, however, the thickness $d_1$ of the housing 110 and the length $d_2$ of the corner may vary based on the dimensions of the device.

As shown in FIG. 3A, the placement of the first IR sensor 120 (and likewise other IR sensors) may be such that the IR sensor 120 lays flat with respect to the internal components of the electronic device 100 (e.g., parallel with a top and/or bottom surface of the device). IR signals reach the IR sensor 120 after entering the housing 110 via one or more openings and reflecting off of the mirror 140. The mirror 140 is positioned such that the mirror 140 reflects incoming IR signals (e.g., a heat signal from a person) towards the IR sensor 120. In the present example, a segmented mirror 140 is shown which modulates the IR signal by reflecting ambient IR signals from separate mirror portions towards the IR sensor 120. The segmented mirror 140 and its interaction with incoming IR signals is described in greater detail below with respect to FIGS. 5A and 5B. Openings in the housing 110 are designed to allow heat emitted by a person to reach the mirror 140, as shown and described in greater detail below with respect to FIG. 4A.

In another embodiment of the first corner of the housing 110 shown in FIG. 3B, the assembly includes like elements to those of FIG. 3A and a singular curved mirror 145. The curved mirror 145 is positioned to direct incoming IR signals towards the flat lying IR sensor 120. For example, the curved mirror 145 may be positioned at an angle of about 45 degrees; at such an angle, the incoming IR signal from an opening in the housing 110 will be directed at the IR sensor 120.

The curved mirror 145 may be segmented to modulate the IR signal as user position changes by reflecting ambient IR signals from separate, segmented mirror portions towards the IR sensor 120. Segmentation of the segmented, curved mirror 145 is shown in FIG. 3B by lines representing a means of division among segments of the mirror. The segments may be divided by etching the mirror 145, by division via a non-reflective additive to the surface (e.g., non-reflecting tape, paint, epoxy, etc. or by creating an angular disruption or redirection), or any other means for dividing the curved mirror 145 into segments separated by non-reflective portions. The separate segments of the mirror 145 receive incoming IR signals from an opening in the housing 110 at mutually distinct angles.

In yet another embodiment of the first corner of the housing 110 shown in FIG. 3C, the assembly includes like elements to those of FIG. 3A and a mirror 150 having a series of dish shaped mirror segments. The mirror 150 is positioned to direct incoming IR signals towards the flat-lying IR sensor 120. For example, mirror 150 may be positioned at an angle of about 45 degrees; at such an angle, the horizontally incoming IR signal from an opening in the housing 110 will be reflected downward by 45 degrees toward the IR sensor 120. The series of dish shaped segments of the mirror 150 act to modulate the IR signal by reflecting ambient IR signals emanating from the user off of separate, segmented mirror portions towards the IR sensor 120. The separate segments of the mirror 145 reflect or focus incoming IR signals from an opening in the housing 110 at mutually distinct angles.

In an embodiment, the mirror 140, the mirror 145, or the mirror 150 may sit higher than the sensor, to avoid blockage by the IR sensor 120. The mirror 140, the mirror 145, or the mirror 150 may be tilted downward to guide the reflected heat signal toward the active area of the sensor 120. In some example embodiments, the active area of the sensor 120 may be positioned towards an upper portion of the interior of the housing 110 or positioned towards an inward portion of the electronic device 100, 102.

Figure 4:
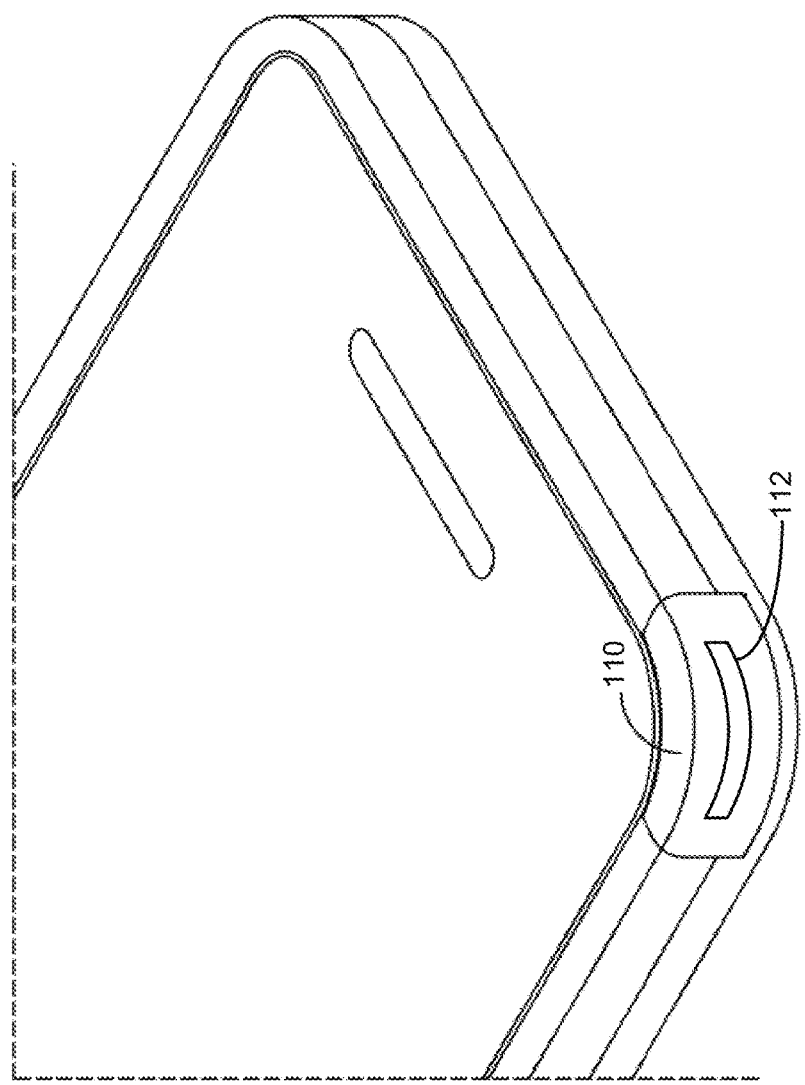
FIG. 4 is a perspective view of a corner of the electronic device of FIG. 1A or FIG. 1B, according to an embodiment.

FIG. 4A is a perspective view of a corner of the electronic devices 100 and 102 of FIG. 1A and FIG. 1B, according to an embodiment. In particular, FIG. 4A illustrates a first opening 112 formed on the housing 110. The first opening 112 may be representative of the openings formed on the one or more corners of the housing 110. However, the first opening 112 may be located on any surface of the housing 110.

As shown, the first opening 112 is a discrete slit in the side of the housing 110. In other embodiments, however, the first opening 112 may have an oval or oblong shape, rectangular shape, triangular shape, a grille or mesh material having tiny holes embedded within each opening, etc. Through the first opening 112, the mirror 140, the mirror 145, or the mirror 150 (as shown in FIG. 3A, FIG. 3B, and FIG. 3C, respectively) has an unobstructed path and line of sight to outside of the electronic device 100 or 102. For example, when a person approaches the device 100 or 102, the body heat emitted by the person is transmitted through the first opening 112, reflected towards the IR sensor 120 by the mirror 140, and then detected by the first IR sensor 120.

Figure 5A:
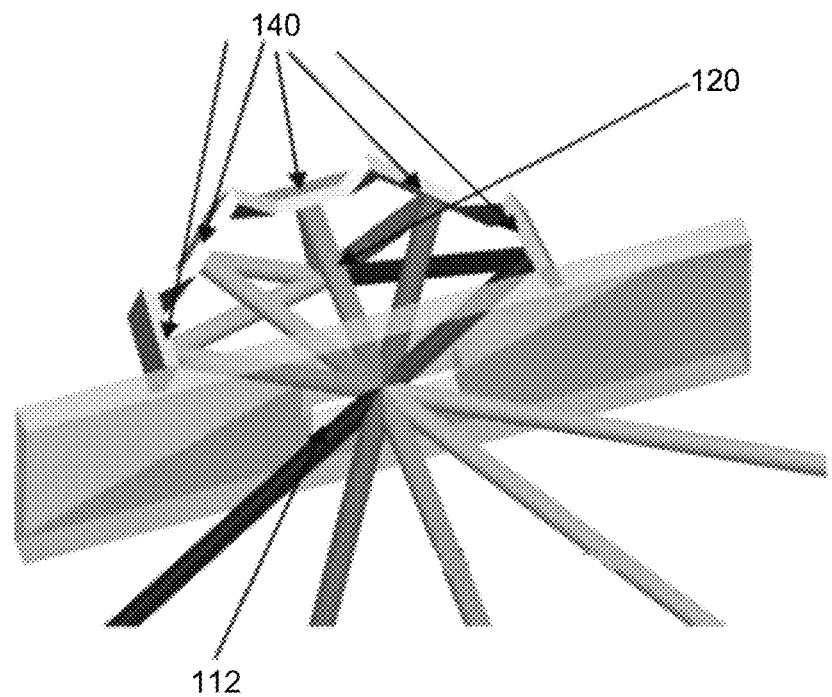
FIGS. 5A and 5B are ray diagrams tracing incoming light paths in perspective views of the mirror and infrared sensor of FIG. 3A, according to an embodiment.
Figure 5B:
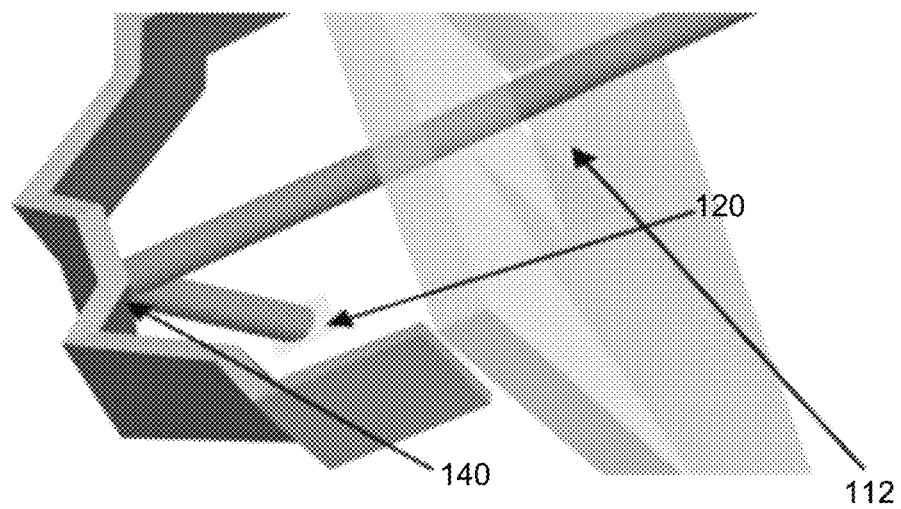

Turning now to FIGS. 5A and 5B, these figures show reception of IR signals by the IR sensor 120, via the opening 112 and reflected towards the IR sensor 120 by the mirror 140. In the example embodiment, the mirror 140 is shown having a plurality of facets or segments which point in slightly different directions. The ambient signals received through the slit 112 may be reflected by the mirror 140 at various angles, mimicking a slotted opening, for motion modulation. By using a segmented mirror 140, the reflected radiant waves from the mirror allows for detection of motion from one segment to another.

As shown, the mirror 140 reflects the light downward towards the IR sensor 120 at an angle configured to direct the signal accurately towards the IR sensor 120. For example, the mirror may be angled about 45 degrees with reference to the plane on which the IR sensor 120 is disposed. The mirror 140 may be placed higher than the sensor and angled downward so that the IR sensor 120 does not obstruct the view of the incoming signal from the opening 112.

Figure 6A:
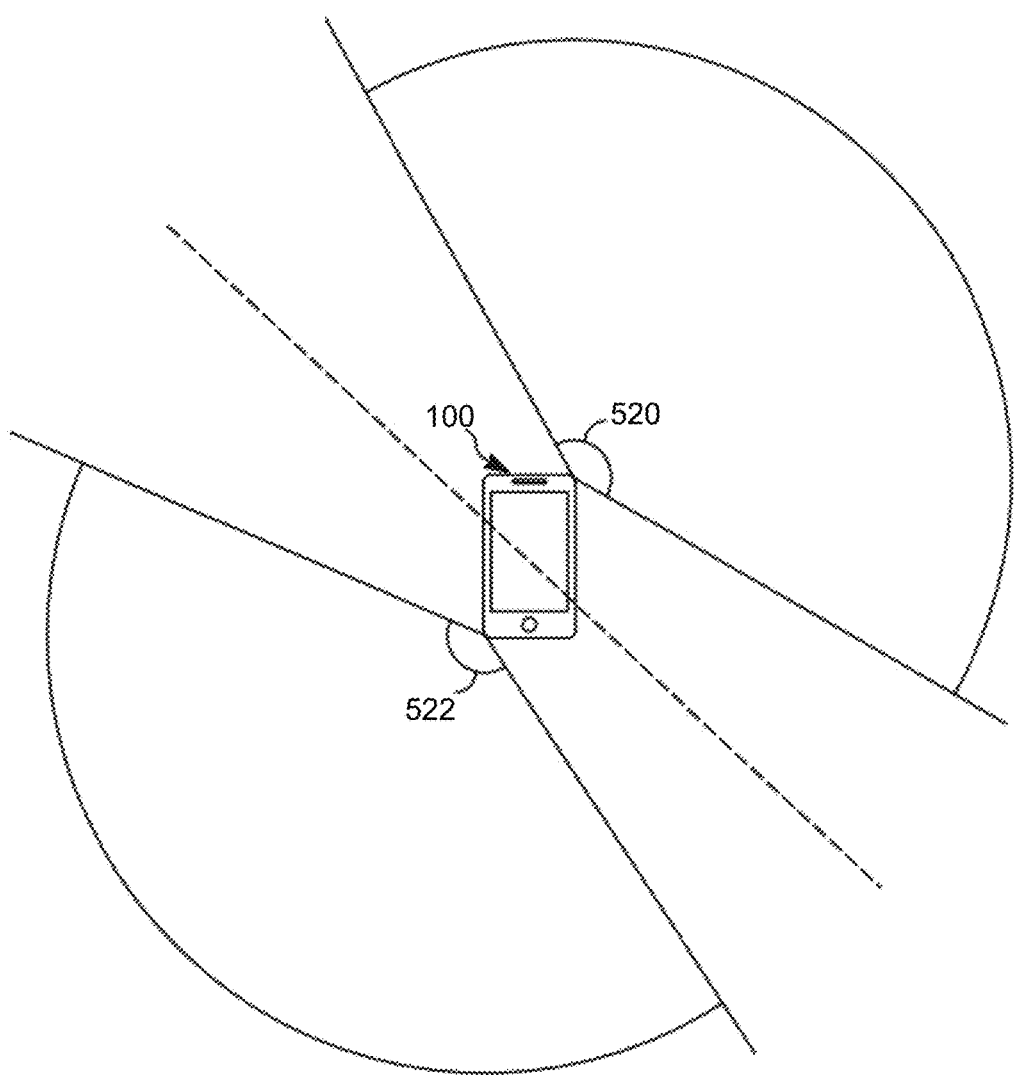
FIGS. 6A-6C are simulated coverage plots showing detection coverage areas of the electronic devices of FIGS. 1A and 1B.
Figure 6B:
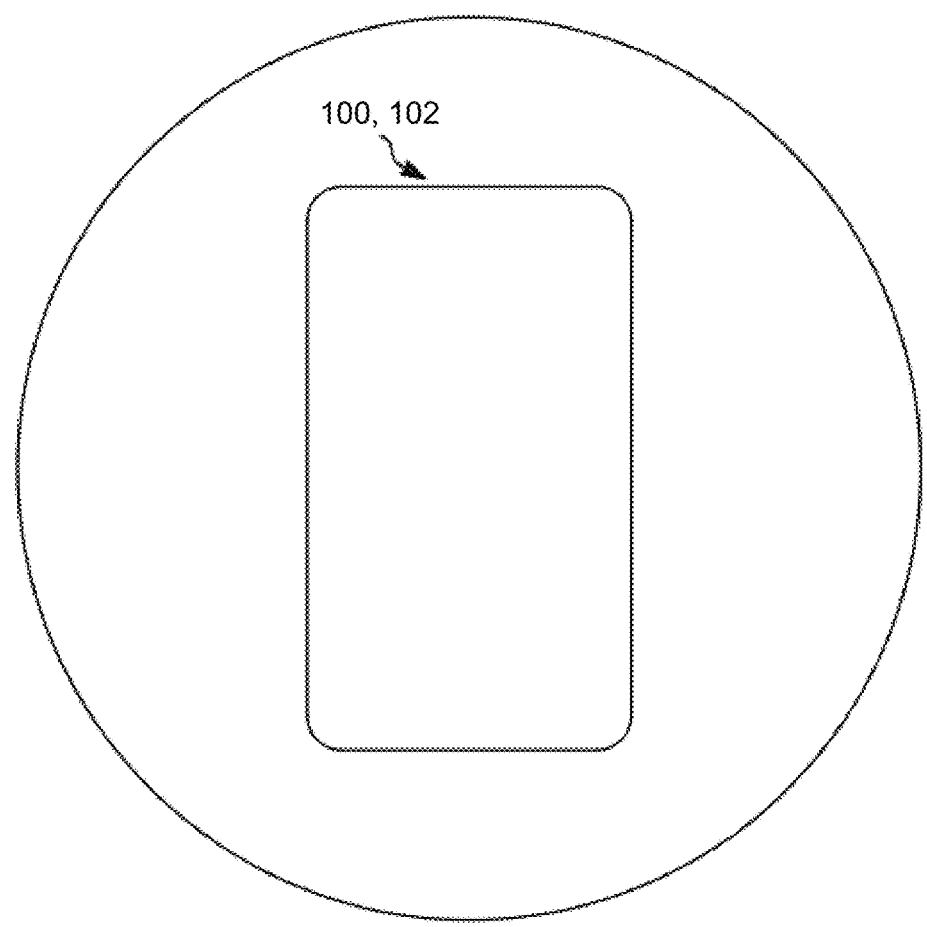
Figure 6C:
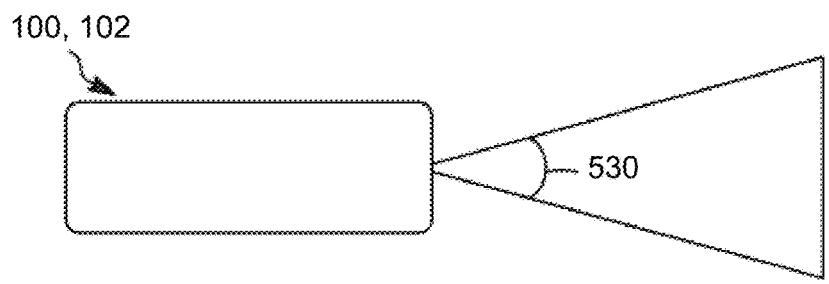

FIGS. 6A-6C show detection coverage areas of the electronic device 100 of FIG. 1A. As discussed above with respect to FIG. 1A, the electronic device 100 includes the first IR sensor 102 and the second IR sensor 122. FIG. 6A illustrates the horizontal-plane detection coverage area of each of the first IR sensor 120 and the second IR sensor 122 via the first plurality of openings and the second plurality of openings, respectively. The first IR sensor 120 has a first coverage area, which is represented by a first angle 520 formed by the first plurality of openings formed on the first corner. The second IR sensor 122 has a second coverage area, which is represented by a second angle 522 formed by the second plurality of openings formed on the second corner.

FIG. 6B illustrates an ideal horizontal-plane detection coverage area of the electronic devices 100 and 102 of FIGS. 1A and 1B. The ideal detection coverage area is 360 degrees around the perimeter of the device 100 or 102 in the horizontal-plane. With this coverage area, presence or movement of a person in any direction with respect to the device 100 or 102 may be detected by the device 100 or 102. Accordingly, in order for the electronic device 100 to achieve as close to the 360 degrees coverage area as possible, each of the first angle 520 and the second angle 522 (as shown in FIG. 6A) may range between about 90 degrees to about 180 degrees. In an embodiment, each of the first angle 520 and the second angle 522 may be as close to 180 as possible. For example, each of the first angle 520 and the second angle 522 may be about 160 degrees.

On the other hand, in order for the electronic device 102 of FIG. 1B—which includes four IR sensors disposed proximate to each corner of the housing 110—to achieve as close to the 360 degrees coverage are as possible, the angle of each opening may be about 90 degrees. The angle of the electronic device 102 may be smaller than the angle of the electronic device 100 because the additional two IR sensors reduce the coverage area of each IR sensor. In other words, each IR sensor of the device 100 must cover a greater area than each IR sensor of the device 102.

FIG. 6C illustrates the elevation detection coverage area of the electronic devices 100 and 102 of FIGS. 1A and 1B. The elevation detection coverage area of the combination of the first IR sensor 120 and the mirror 140, 145, or 150 is represented by an elevation angle 530. The elevation angle 530 is subject to the design of the opening and may have a smaller angle that is acceptable. For example, the elevation angle 530 may be about 30 degrees to detect a person walking by a table. Thus, in three-dimensional space, the detection coverage area of each IR sensor of the electronic devices 100 and 102 forms a substantially conical shape.

Figure 7:
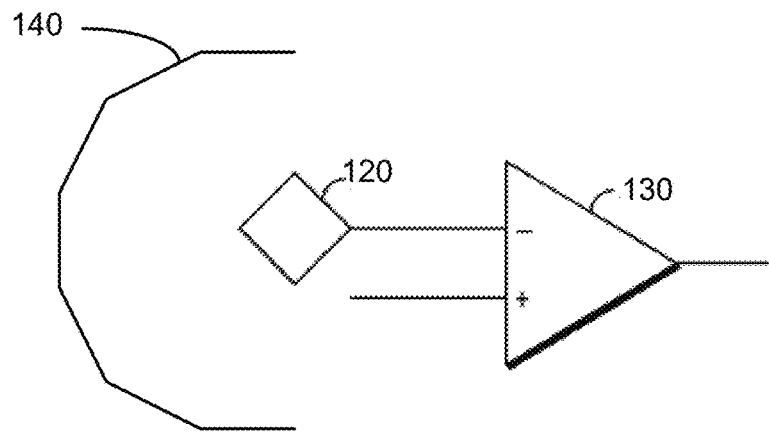
FIG. 7 is a circuit diagram showing a example configuration of a presence and motion detection system of the electronic devices of FIGS. 1A and 1B.

FIG. 7 shows a configuration of a presence and motion detection system of an electronic device. The presence and motion detection system includes a thermopile sensor (e.g., first IR sensor 120) with a mirror having motion modulating portions.

In another embodiment, a plastic film covering the openings may be disposed outside the housing to prevent dust or water from entering the device. The plastic film may be a super thin polyethylene film, which is a material that passes wavelengths of body heat. The thin plastic film may have a thickness of about 0.05 or about 0.1 millimeters. The thin plastic film seals device and relies on the structure of the openings for strength.

In particular, FIG. 7 illustrates the first IR sensor 120, the circuit 130, and the mirror 140. The first IR sensor 120 is connected to the circuit 130, which enables communication between the first IR sensor 120 and the processor in the electronic device (e.g., the processor 204 of FIG. 2). The first IR sensor 120 has an unobstructed path and line of sight to the mirror 140, which reflects the heat signal which enters the housing 110 via the opening 112. The mirror 140 is shown having a plurality of segments for modulating the incoming signal. While the mirror 140 is shown, analogous embodiments including the mirror 145 or the mirror 150 are possible.

To detect the presence of a person near the device, the first IR sensor 120 detects the heat (IR signal) emitted by the person via any opening and reflected by the mirror 140. The circuit 130 (e.g., an application-specific integrated circuit) converts the received IR signal into an electric signal (e.g., the circuit 130 may generate a voltage based on the received IR signal). The processor then performs an analysis of the electric signal to determine the presence of the person. The device detects the presence of the person when heat emitted by the person is received by the first IR sensor 120.

To detect motion of the person, the processor analyzes the changing (modulated) heat reception via the mirror segments as the person walks or moves near device. When a person starts at position one, a first mirror segment is lined up with the person, and thus allows heat (IR radiation) emitted by the person to reach the IR sensor. As the person walks near device, that first mirror segment is no longer lined up with person. Instead, a different, second mirror segment is lined up with the person's new position. The second mirror segment allows heat emitted by the person to reach the IR sensor, after new segment, which is at a different angle, is approached. This process results in heat modulation as the heat path between person and IR sensor changes via the many mirror segments, from which motion may be inferred.

Referring to FIG. 7, to detect the motion of the person (e.g., the person is approaching or moving near the device), the segments of the mirror modulate the heat (IR signal) emitted by the person that is received by the first IR sensor 120. When the first IR sensor 120 detects heat emitted by the person received via one of the segments of the mirror, the first IR sensor 120 may generate a first signal. When the first IR sensor 120 detects heat emitted by the person received via another of the segments of the mirror, the first IR sensor 120 may generate a second signal. The processor then analyzes the first and second signals to determine whether the person is in motion. The processor detects the movement of the person based on a relative change of the first and second signal. For instance, when the person is moving about the device, the IR signals received via each of the plurality of mirror segments may vary. The variance between the received IR signals thus reflects the motion of the person.

Accordingly, to detect presence, the IR sensor only needs to receive heat through any opening or a combination of the openings via a mirror. To detect motion, the received heat signal is analyzed over time to detect filter modulation. Modulation is the result of heat passing from one mirror segment and then switching to another mirror segment, then another and then another. In an embodiment, a high pass filter may be used, which filters out signals representing presence and passes (allows to pass) the signals representing motion.

Figure 8:
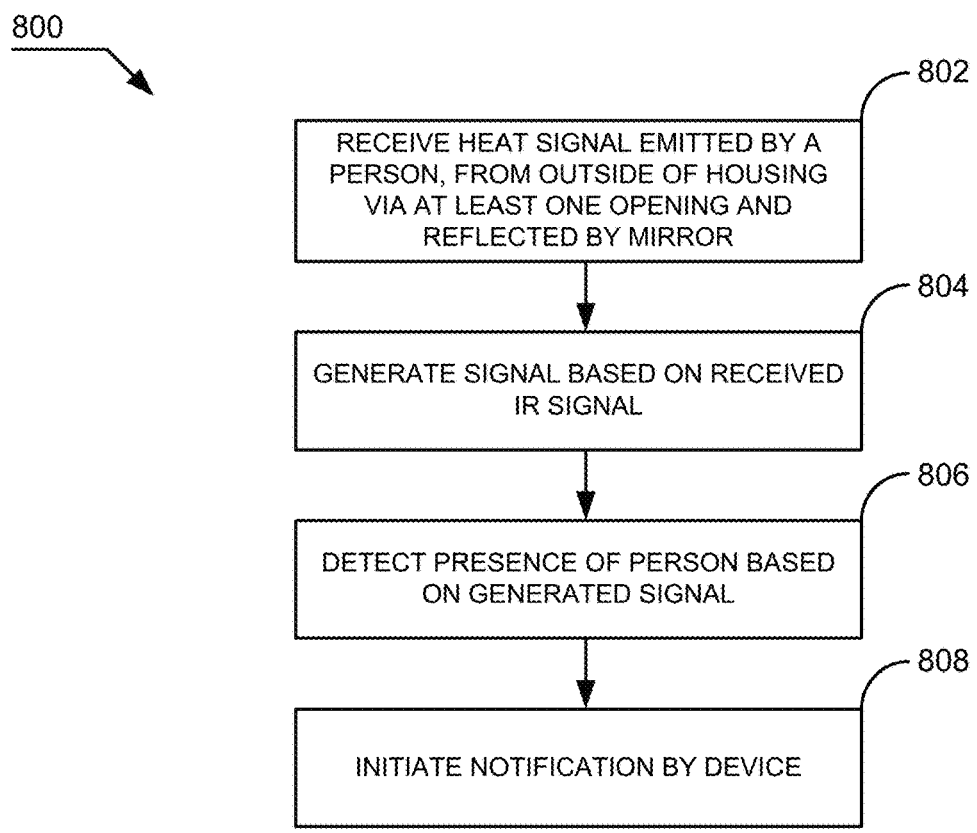
FIGS. 8 and 9 are flow diagrams showing steps that may be carried out in accordance with various embodiments.

FIG. 8 illustrates a procedure 800 that may be carried out by an electronic device such as any of those described above, according to one or more embodiments of the disclosed principles. At step 802, at least one IR sensor of the device receives heat (IR signal) emitted by a person from outside of the device via at least one opening of a plurality of openings as reflected by a mirror internal to the electronic device. Based on the received IR signal, the processor of the device generates a signal at step 804. Using the generated signal, the device detects the presence of the person at step 806. In particular, as discussed above, when the IR sensor detects heat emitted by the person from any of the openings, the device recognizes that that person is present, regardless of whether the person is moving.

Next, at step 810, the processor of the device may carry out a function in response to the detection of the person's presence, such as initiating a notification. To initiate the notification, the device may display a notification on a display unit of the device, emit a notification sound from the device, or vibrate the device.

The processor of the device may carry out other functions when it determines that the person is present. These functions may include answering a call, dismissing a call, silencing a ringer, sending a call to voicemail, turning on a screen, waking up the electronic device, viewing the time, scrolling a screen, scrolling through photos, panning a map, alerting of messages, magnifying a view, switching audio mode, setting audio level, steering audio toward the person's location, steering camera toward the person's location, and altering device functionality based on distance between the person and the device.

Figure 9:
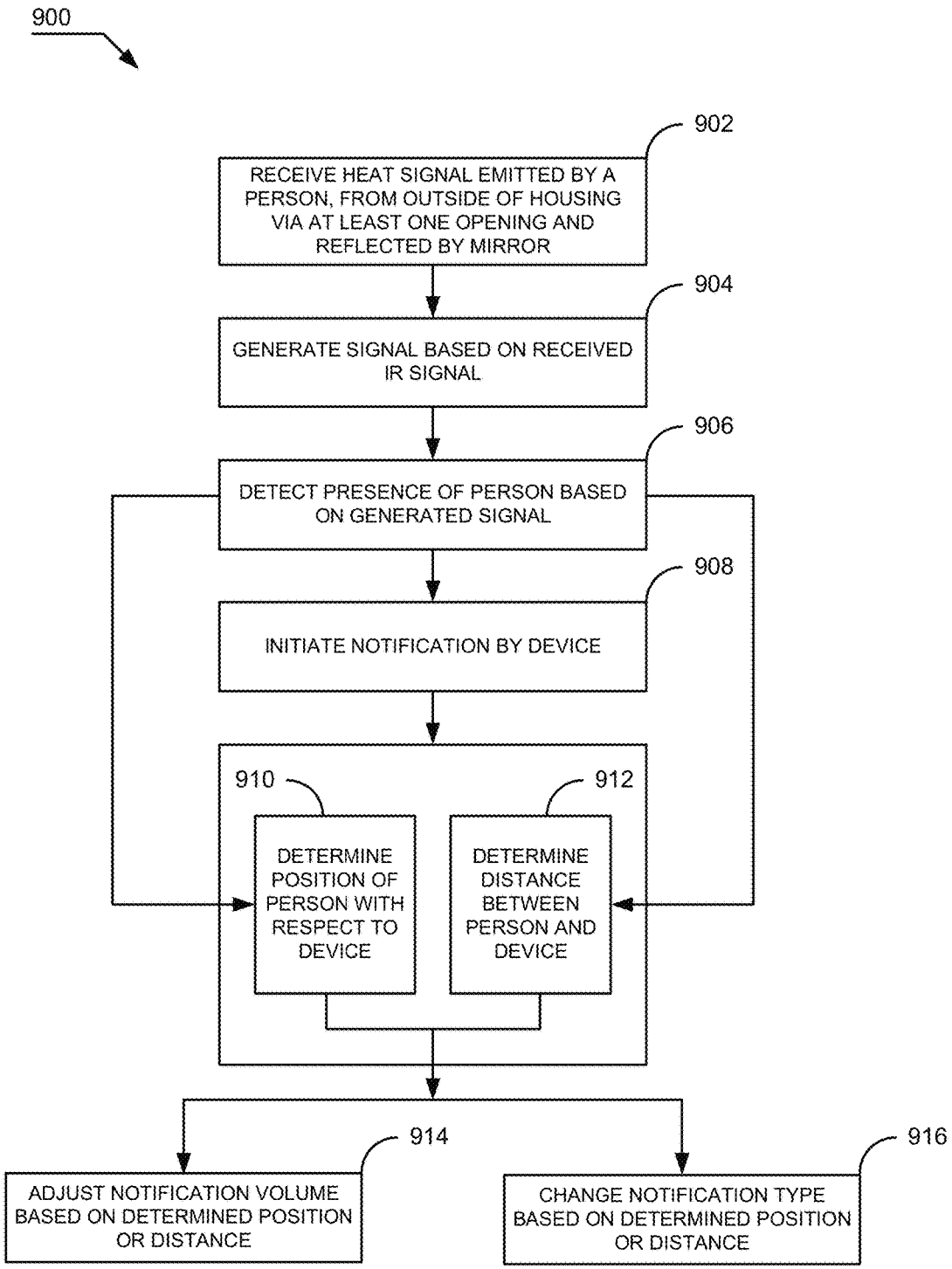

FIG. 9 illustrates a procedure 900 that may be carried out by an electronic device, according to a further embodiment. At step 902, at least one IR sensor of the device receives heat (IR signal) emitted by a person from outside the housing of the device via at least one opening and reflected towards the at least one IR sensor by a mirror. Based on the received IR signal, the processor of the device generates a signal at step 904. Using the generated signal, the device detects the presence of the person at step 906. If the presence or motion of the person is detected, the device may initiate a notification at step 908.

Furthermore, upon detecting the presence of the person at step 906, the device may determine the position/location of the person with respect to the device at step 910. Using the direction or position information, the device may orient the display screen so that the screen is easily readable by the user (e.g., orient the display screen so text or other display elements are displayed right-side up). At step 912, the device may determine the distance and/or change in the distance between the person and the device.

If the initiated notification at step 908 is an emission of a notification sound, then at step 914, based on the determined position or distance of the person with respect to the device, the device may adjust the notification sound volume. As the person approaches the device (i.e., the distance decreases), the device may control the adjusted notification volume so that it does not exceed an initial notification volume.

Optionally, at step 916, based on the determined position or distance of the person with respect to the device, the device may change a type of notification based on the determined position or distance between the person and the device. For instance, the device may emit a notification sound when the person is first detected. When the person is within a predetermined distance of the device (e.g., the person is close enough to the device to clearly view the display screen), the device may stop emitting the notification sound and change the notification to a display notification.

In other embodiments, based on the determined position or distance of the person with respect to the device, the device may repeat the initiated notification.

In an embodiment, one or more input devices (e.g., a camera, an imaging device, or a microphone) may be disposed proximate or near each of the IR sensors. When an IR sensor detects the presence of a person, the corresponding input device of the IR sensor, which is oriented toward the direction of the person's presence and approach, is turned on. Similarly, if more than one IR sensor detects the presence of the person, the corresponding input devices of the IR sensors, which are oriented toward the direction of the person's presence and approach, are turned on. In other words, the IR sensors act as direction triggers for activating their corresponding input devices.

It can be seen from the foregoing that an electronic device and methods for detecting presence and motion using IR sensors have been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. An electronic device, comprising:
   a display screen;
   a housing having an interior and an exterior, the housing having therein an opening from the interior to the exterior;
   an infrared sensor located within the interior of the housing, the infrared sensor being configured to generate a first indication signal responsive to detecting a first infrared signal, and to generate a second indication signal responsive to detecting a second infrared signal different from the first infrared signal;
   a mirror disposed within the interior of the housing, the mirror having an unobstructed optical path to at least a portion of the exterior of the housing via the opening, the mirror also being oriented to direct incoming infrared signals received via the opening, including the first infrared signal and the second infrared signal, towards the infrared sensor, wherein the mirror includes a plurality of portions that are oriented to reflect at least some of the incoming infrared signals towards the infrared sensor at mutually distinct angles; and
   a processor configured to:
      receive the first indication signal from the infrared sensor responsive to the infrared sensor detecting the first infrared signal;
      receive the second indication signal from the infrared sensor responsive to the infrared sensor detecting the second infrared signal;
      determine, based on an analysis of the first indication signal and the second indication signal, position of a person with respect to the electronic device; and
      alter, based on the position of the person with respect to the electronic device, an orientation of display elements that are output for display at the display screen of the electronic device.

2. The electronic device of claim 1, wherein the plurality of portions of the mirror comprises a plurality of segments, and wherein the mirror is a segmented mirror having the plurality of segments oriented to receive the at least some of the incoming infrared signals via the opening at the mutually distinct angles.

3. The electronic device of claim 1, wherein the mirror is a continuously curved mirror.

4. The electronic device of claim 3, wherein the plurality of portions of the continuously curved mirror comprises a plurality of mirror segments, the plurality of mirror segments oriented to receive the at least some of the incoming infrared signals via the opening at the mutually distinct angles.

5. The electronic device of claim 1, wherein the plurality of portions of the mirror comprises a series of dished reflecting surfaces.

6. The electronic device of claim 5, wherein each member of the series of dished reflecting surfaces is configured to cover a respective mutually distinct angle of the mutually distinct angles for receiving the at least some of the incoming infrared signals via the opening.

7. The electronic device of claim 1, wherein the mirror is oriented such that it forms substantially a 45 degree angle with respect to a plane of positioning of the infrared sensor.

8. The electronic device of claim 1, wherein the processor is further configured to determine, based on the analysis of the first indication signal and the second indication signal, a motion of the person with respect to the electronic device.

9. The electronic device of claim 1, wherein the infrared sensor is a thermopile sensor.

10. An electronic device, comprising:
a housing that includes a first corner defining a first opening and a second corner defining a second opening, wherein the first corner is disposed substantially diagonally opposite from the second corner;
a first infrared sensor positioned within the housing and proximate to the first corner, wherein the first infrared sensor has a first detection coverage area around the electronic device in a horizontal plane, the first detection coverage area being represented by a first angle formed by the first opening at the first corner;
a first mirror disposed proximate to the first corner and having a first unobstructed path and line of sight to an outside of the electronic device via the first opening and oriented to direct a first group of incoming infrared signals received via the first opening towards the first infrared sensor, wherein the first mirror includes a plurality of portions that are oriented to reflect at least some of the first group of incoming infrared signals towards the first infrared sensor at mutually distinct angles and in non-parallel directions;
a second infrared sensor positioned within the housing and proximate to the second corner, wherein the second infrared sensor has a second detection coverage area around the electronic device in the horizontal plane, the second detection coverage area being represented by a second angle formed by the second opening at the second corner;
a second mirror disposed proximate to the second corner and having a second unobstructed path and line of sight to the outside of the electronic device via the second opening and oriented to direct a second group of incoming infrared signals towards the second infrared sensor; and
a processor configured to:
receive a first indication signal from the first infrared sensor responsive to the first infrared sensor detecting a first infrared signal included in the first group of incoming infrared signals;
receive a second indication signal from the second infrared sensor responsive to the second infrared sensor detecting a second infrared signal included in the second group of incoming infrared signals;
determine, based on an analysis of the first indication signal and the second indication signal, at least one of a distance of a person from the electronic device or a position of the person with respect to the electronic device; and
alter, based on the at least one of the distance of the person from the electronic device or the position of the person with respect to the electronic device, functionality of the electronic device by at least one of adjusting a volume associated with a notification that is output by the electronic device or orienting display elements that are output for display by the electronic device.

11. The electronic device of claim 10, wherein the housing further comprises a third corner having a third opening and a fourth corner having a fourth opening, wherein the third corner is disposed substantially diagonally opposite from the fourth corner and wherein the electronic device further comprises:
a third infrared sensor positioned within the housing and proximate to the third corner;
a third mirror disposed proximate to the third corner and having a third unobstructed path and line of sight to the outside of the electronic device via the third opening and oriented to direct a third group of incoming infrared signals towards the third infrared sensor;
a fourth infrared sensor positioned within the housing and proximate to the fourth corner; and
a fourth mirror disposed proximate to the fourth corner and having a fourth unobstructed path and line of sight to the outside of the electronic device via the fourth opening and oriented to direct a fourth group of incoming infrared signals towards the fourth infrared sensor.

12. The electronic device of claim 10, wherein the second mirror includes a plurality of portions that are oriented to reflect at least a portion of the second group of incoming infrared signals towards the second infrared sensor at mutually distinct angles.

13. The electronic device of claim 10,
wherein the first angle is in a range of approximately 90 to 180 degrees, and
wherein the second angle is in the range of approximately 90 to 180 degrees.

14. The electronic device of claim 10,
wherein the first detection coverage area further includes a first elevation detection coverage area represented by a first elevation angle associated with the first infrared sensor and the first mirror, and
wherein the second detection coverage area further includes a second elevation detection coverage area represented by a second elevation angle associated with the second infrared sensor and the second mirror.

15. A method comprising:
receiving, by an electronic device, a first indication signal generated by at least one infrared sensor responsive to the at least one infrared sensor detecting a first infrared signal associated with a person;
receiving, by the electronic device, a second indication signal generated by the at least one infrared sensor responsive to the at least one infrared sensor detecting a second infrared signal associated with the person, wherein the electronic device includes a housing defining at least one opening, wherein the at least one infrared sensor is located within the housing, wherein the electronic device further includes at least one mirror within the housing that has at least one unobstructed optical path and line of sight to an outside of the electronic device via the at least one opening, wherein the at least one mirror is oriented to direct incoming infrared signals received via the at least one opening, including the first and second infrared signals associated with the person, towards the at least one infrared sensor, and wherein the at least one mirror includes a plurality portions that are oriented to reflect at least a portion of the incoming infrared signals towards the at least one infrared sensor at mutually distinct angles; and determining, by the electronic device, based on an analysis of the first indication signal and the second indication signal, a position of a person with respect to the electronic device; and altering, by the electronic device, based on the position of the person with respect to the electronic device, an orientation of display elements that are output for display by the electronic device.

16. The method of claim 15, further comprising determining a distance between the person and the electronic device.

* * * * *